United States Patent
Sallas et al.

(10) Patent No.: US 9,746,569 B2
(45) Date of Patent: Aug. 29, 2017

(54) STATIONARY MARINE VIBRATORY SOURCE FOR SEISMIC SURVEYS

(71) Applicant: CGG SERVICES SA, Massy (FR)

(72) Inventors: John Sallas, Plano, TX (US);
Dominique Thomas, Gif-sur-Yvette (FR)

(73) Assignee: CGG SERVICES SAS, Massy (FR)

( * ) Notice: Subject to any disclaimer, the term of this patent is extended or adjusted under 35 U.S.C. 154(b) by 497 days.

(21) Appl. No.: 14/138,859

(22) Filed: Dec. 23, 2013

(65) Prior Publication Data

US 2014/0369161 A1 Dec. 18, 2014

Related U.S. Application Data

(60) Provisional application No. 61/858,231, filed on Jul. 25, 2013, provisional application No. 61/834,575, filed on Jun. 13, 2013.

(51) Int. Cl.
*G01V 1/38* (2006.01)
*G01V 1/00* (2006.01)

(52) U.S. Cl.
CPC ............ *G01V 1/3808* (2013.01); *G01V 1/005* (2013.01); *G01V 1/006* (2013.01); *G01V 1/3861* (2013.01)

(58) Field of Classification Search
CPC ...... G01V 1/3861; G01V 1/006; G01V 1/005; G01V 1/3808
USPC ....................................... 367/15, 23
See application file for complete search history.

(56) References Cited

U.S. PATENT DOCUMENTS

| | | | | | |
|---|---|---|---|---|---|
| 3,687,205 | A | * | 8/1972 | Mori | E21B 19/09 175/27 |
| 4,872,144 | A | * | 10/1989 | Young | G01V 1/3808 181/112 |
| 4,918,668 | A | | 4/1990 | Sallas | |
| 6,951,138 | B1 | * | 10/2005 | Jones | G01V 1/3852 367/159 |
| 7,359,282 | B2 | * | 4/2008 | Tulett | G01V 1/3861 181/110 |
| 2010/0118647 | A1 | * | 5/2010 | Tenghamn | G01V 1/005 367/24 |
| 2010/0149912 | A1 | | 6/2010 | Yang et al. | |
| 2012/0147701 | A1 | | 6/2012 | Ross et al. | |
| 2013/0100778 | A1 | | 4/2013 | Ruet et al. | |

FOREIGN PATENT DOCUMENTS

| | | |
|---|---|---|
| GB | 1 583 042 A | 1/1981 |
| WO | 2009/005918 A1 | 5/2009 |

OTHER PUBLICATIONS

International Search Report in corresponding International Application No. PCT/EP2014/062186 mailed Jan. 8, 2015.
Written Opinion in corresponding International Application No. PCT/EP2014/062186 mailed Jan. 8, 2015.

* cited by examiner

*Primary Examiner* — Daniel L Murphy
(74) *Attorney, Agent, or Firm* — Patent Portfolio Builders PLLC

(57) ABSTRACT

A seismic data acquisition system is configured to collect seismic data. The system includes a marine source array configured to be attached to a fixed structure floating at the water surface and including vibratory source elements; and a controller configured to control the vibratory source elements so that a beam formed by the source array is steerable.

19 Claims, 11 Drawing Sheets

STATIONARY MARINE VIBRATORY SOURCE FOR SEISMIC SURVEYS

CROSS REFERENCE TO RELATED APPLICATIONS

The present application claims the benefit of priority under 35 U.S.C. §119(e) to U.S. Provisional Application Nos. 61/834,575 filed on Jun. 13, 2013 and 61/858,231 filed on Jul. 25, 2013. The entire contents of each of the above documents is hereby incorporated by reference into the present application.

BACKGROUND

Technical Field

Embodiments of the subject matter disclosed herein generally relate to methods and systems and, more particularly, to mechanisms and techniques for illuminating a desired target during a seismic survey performed with stationary seismic sources.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural sensors, it is possible to estimate the depth and/or composition of the features causing such reflections. These features may be associated with subterranean hydrocarbon deposits.

For marine applications, sources are mainly impulsive (e.g., compressed air is suddenly allowed to expand). One of the most used sources is air guns which produce a high amount of acoustic energy over a short time. Such a source is towed by a vessel either at the water surface or at a certain depth. Acoustic waves from the air gun propagate in all directions. The emitted acoustic waves' typical frequency range is between 6 and 300 Hz. However, the frequency content of the impulsive sources is not fully controllable, and different sources are selected depending on a particular survey's needs. In addition, use of impulsive sources can pose certain safety and environmental concerns.

Thus, another class of sources that may be used are vibratory. Vibratory sources, including hydraulically-powered, electrically-powered or pneumatically-powered sources and those employing piezoelectric or magnetostrictive material, have been used in marine operations. However, there is no large-scale use of such sources because they have limited power and are unreliable due to the number of moving parts required to generate seismic waves. A positive aspect of vibratory sources is that they can generate signals that include various frequency bands, commonly referred to as "frequency sweeps." In other words, the frequency band of such sources may be better controlled, as compared to impulsive sources.

One example of such a vibratory source is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

Recent trends in the field of seismic exploration suggest that techniques for conducting 4-dimensional (4D) surveys to image known hydrocarbon reservoirs are in high demand. 4D seismic surveys are 3D surveys that are repeated, for example, several times a year. By comparing images generated by each 3D survey over time, the differences in successive surveys may be analyzed to help provide useful information to petroleum engineers so they may adjust injection or pumping schedules to facilitate efficient extraction of hydrocarbon deposits. For land exploration, one such system developed by the assignee of this patent application is called Seismovie™ surveying. In Seismovie surveying, a plurality of piezoelectric sources is buried at a depth sufficient to ensure that source coupling remains invariant over time. Also, the piezoelectric sources are buried deep enough so that factors like soil moisture and others are not a problem. Geophones and/or hydrophones are also buried for 4D land monitoring. Permanent installation of sources and sensors helps to ensure survey repeatability so that changes to the reservoir should be the only variable, resulting in easier comparisons over time.

However, the situation is different in the marine environment. Typically, neither the source array nor the sensors are fixed. In some situations, the sensors are located on the ocean floor, e.g., ocean bottom cables or ocean bottom nodes. A traditional marine acquisition system 100 is illustrated in FIG. 1. System 100 includes a vessel 110 configured to tow a source array 120 and one or more streamers 130. Source array 120 may include a low-frequency array 122 and a high-frequency array 124 towed at different depths. Vessel 110 may include a controller 112 configured to actuate the source array and/or receive seismic data from sensors 132 distributed along streamer 130. Controller 112 may be configured to have other capabilities, for example, to interact with the navigation system, to control various birds 134 distributed along the streamer. Streamer 130 may have various shapes, i.e., linear, curved, variable-depth, etc. Controller 112 may also be configured to command other position control devices not shown in FIG. 1 that are associated with the source array.

During a seismic survey, vessel 110 follows a pre-determined path to cover the survey area of interest. Source elements of the source array are fired at pre-determined positions and moving sensors record reflected and/or refracted seismic waves. However, for a 4D seismic survey, because at least two different 3D seismic surveys are performed over the same area of interest, shooting the source elements at exactly the same locations and recording the seismic signals at the same receiver locations is a challenging task. Note that water currents may be strong, which make the source elements and/or the sensors deviate from their pre-determined positions, ocean waves may keep the vessel from following exactly the pre-determined path, etc.

Thus, there is a need to overcome the above-noted difficulties and to provide a new seismic acquisition data system with good repeatability, irrespective of ambient conditions.

SUMMARY

According to one embodiment, there is a seismic data acquisition system for collecting seismic data. The system includes a marine source array configured to be attached to a fixed structure floating at the water surface and including vibratory source elements; and a controller configured to control the vibratory source elements so that a beam formed by the source array is steerable.

According to another embodiment, there is a marine source array for generating seismic energy. The source array includes plural vibratory source elements permanently attached to a fixed structure substantially stationary in water;

and a controller configured to control the vibratory source elements so that a beam formed by the source array is steerable.

According to another embodiment, there is a method for illuminating a weak underwater target. The method includes suspending a source array from a fixed structure that is substantially stationary in water during a seismic survey; downloading in a controller of the source array a first sweep signal; applying the first sweep signal to the source array to generate a beam having a first direction; and emitting the beam toward a subsurface of interest.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
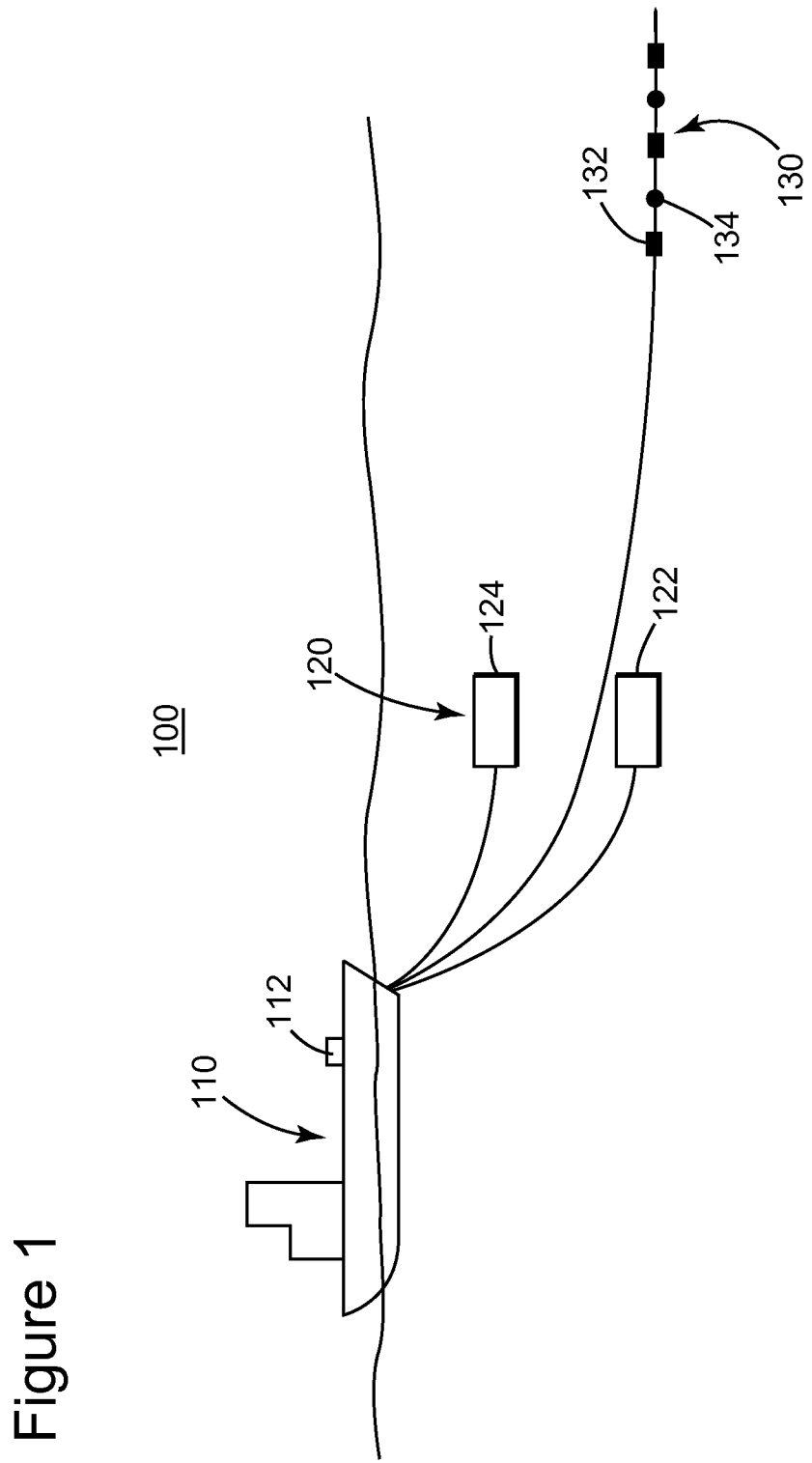
FIG. 1 is schematic diagram of a traditional marine seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source array that includes plural individual vibratory source elements configured to generate acoustic energy in a marine environment. However, the embodiments to be discussed next are not limited to a marine environment; they may be applied to any type of source array in which its individual elements interact with each other while shooting or in which control of a shape of the source array's output beam is desired.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a seismic acquisition system that includes one or more vibratory source arrays attached to a permanent structure, e.g., a rig, having one or more source elements. One or more seismic sensors are distributed around an area of interest, for example, on a streamer, ocean bottom cables, ocean bottom nodes or autonomous self-propelling nodes. The source elements may be independently actuated to form a beam which can be steered to illuminate, for example, a weak target in the area of interest. Variations of this embodiment are now discussed.

A vibratory source array may include one or more vibratory source elements. For simplicity, a vibratory source element is referred to as a "source element," and the entire vibratory source array is referred to as a "source array." A source element may have an electro-magnetic linear actuator system configured to drive a piston (or a pair of pistons). However, it is possible to have a hydraulic, pneumatic or piezoelectric actuator or other appropriate mechanisms instead of the electro-magnetic actuator. Each source element may be driven by an appropriate pilot signal. A pilot signal is designed as a source array target signal such that the total array far-field output follows a desired target power spectrum. A drive signal derived from the pilot signal is applied to each source element. For the case where all the source elements are identical and in phase with one another, the pilot signal and drive signal may be identical. In special cases where, for example, the source elements are not in phase, as might occur in beam-forming applications, the drive signals applied to each source element may not have the same phase and/or amplitude spectrum as the pilot signal. A pilot signal may have any shape, e.g., pseudo-random, cosine or sine, increasing or decreasing frequency, etc. The source array driving frequencies are a set or range of frequencies to be generated by the source array. For example, drive frequencies may be generated consecutively, as might be the case for a swept sine wave pilot signal, or effectively simultaneously or semi-simultaneously, as might be the case if a pseudo-random pilot signal were employed.

Typical marine locations for conducting 4D surveys are located in areas with producing reservoirs and thus, where oil platforms and other structures in fixed positions or relatively fixed positions are present. Therefore, according to an embodiment, one or more source arrays may be attached or suspended from these structures. Attaching one or more source arrays to existing infrastructure may reduce installation costs. In addition, by having source arrays with fixed positions, the seismic survey's repeatability is greatly improved.

However, a potential disadvantage of having a source array fixed to a given location is related to the fact that weak subsurface targets may not be optimally illuminated. Thus, in one embodiment, source elements of the source array are individually controlled to form a beam whose orientation can be controlled so the subsurface target is properly illuminated. Thus, according to an embodiment, a permanent marine source has the capability to direct (or steer) the acoustic energy without having to install source arrays at new locations.

Figure 2:
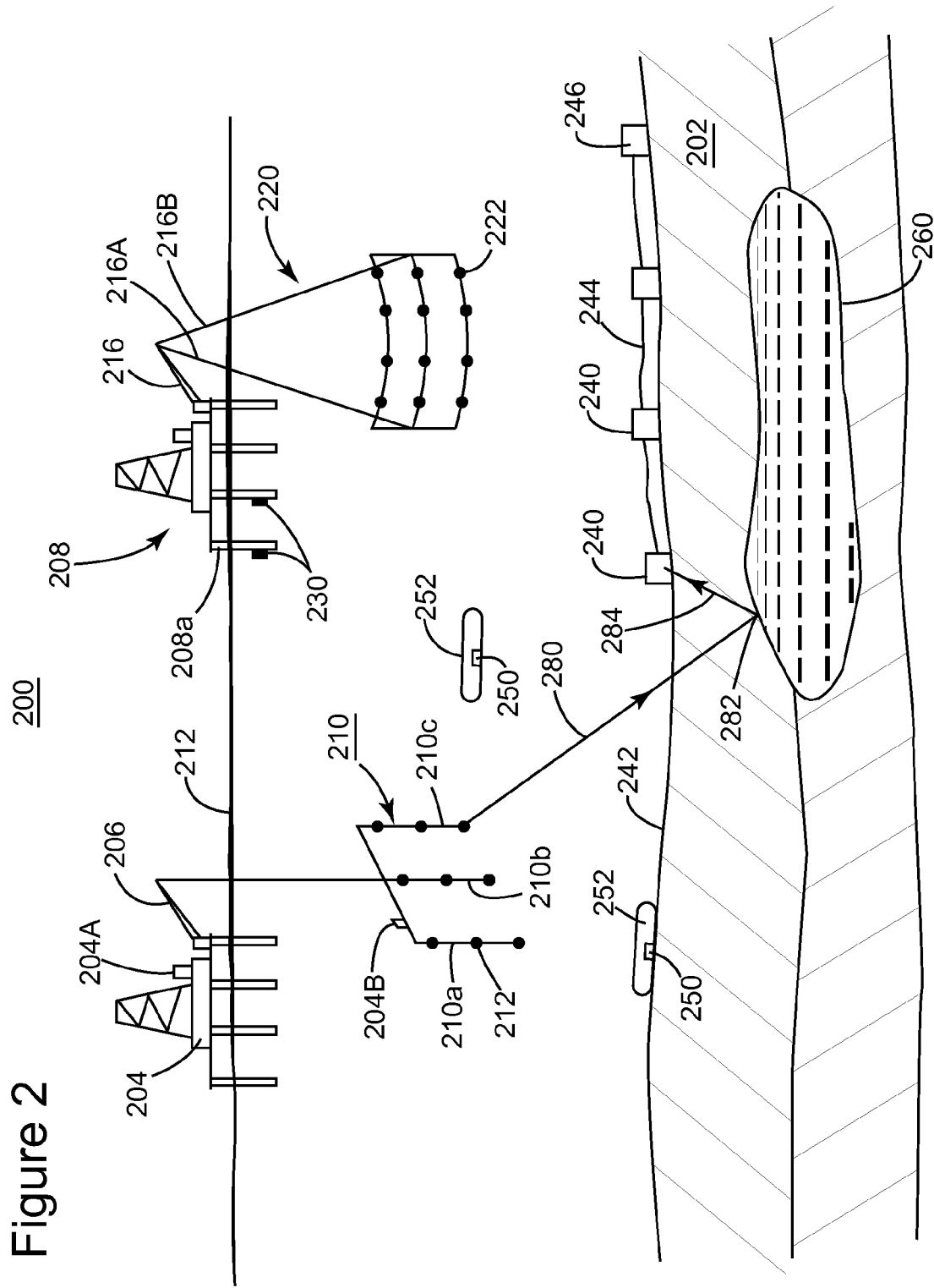
FIG. 2 is a schematic diagram of a marine seismic survey system that uses a permanent source array having a steerable beam.

These embodiments are now discussed with regard to the figures. FIG. 2 shows a seismic acquisition system 200 configured to generate seismic energy and also to record seismic signals reflected and/or refracted from the subsurface 202. System 200 may include a fixed structure 204, for example, an oil platform. Note that an oil platform is considered a stationary structure although it is designed to move slightly in response to ocean swells. Fixed structure 204 may also be a stationary vessel, an artificial island, a natural island, a stationary platform, an ocean windmill platform, an onshore peer or dock, etc.

A support device 206, e.g., a crane, may be attached to the fixed structure and supports a source array 210. Source array 210 is shown completely submerged in water in the figure. However, source array 210 may be partially submerged or located just below the water surface 212. In one application, a depth of the source array may be adjusted with the support device 206. A controller 204A located on the fixed structure 204 may control support device 206 for adjusting source array 210's depth. More than one fixed structure 204 may be present. FIG. 2 shows another fixed structure 208 equipped with another source array 220. Source array 220 may be similar or different from source array 210.

Source array 220 is shown suspended from a second support device 216. In one application, a distribution of source elements 222 forming source array 220 may be adjusted. For example, second support device 216 may have an appropriate mechanism for independently adjusting a length and/or position of cables 216A and 216B so that the geometry of source array 220 may be changed. This mechanism may be controlled by a controller similar to controller 204A. In one application, source array 220's geometry is maintained constant while the position of the entire source array is adjusted. In one embodiment, a source array 230 is fixedly attached directly to fixed structure 208 (or 204), for example, to legs 208a of the fixed structure. A fixed structure may have one or more source arrays. In one application, the same fixed structure has the suspended source array 220 and the fixedly attached source array 230. Any other combination of source arrays may be used as long as they are substantially stationary. The term "substantially stationary" encompasses slight motions of the source array, for example, due to motion of the oil platform, but is different from a case in which the source array is intentionally towed by a corresponding vessel, such as in a traditional seismic survey.

Source array 210 may include plural sub-arrays 210a-c, and each sub-array may include a given number of source elements 212. A source element 212 may be any known type of vibratory source, i.e., a source capable of generating a frequency sweep. A sub-array may have any number of source elements, which may be distributed along corresponding vertical lines, as illustrated in FIG. 2. However, in one application, source elements 222 may be distributed along horizontal lines, as is the case with source array 220. The distribution and position of the source elements may take any other shape, e.g., along curved lines, slanted lines, etc.

One or more of the fixed structures may include global controller 204A configured to control an actuation of the source array. Source array 210 may include a local controller 204B (e.g., one for each sub-array or one for each source element) that communicates with global controller 204A. These controllers are configured to actuate the source array according to any desired sequence. Such controllers are described later and allow the operator to modify the sequence. In one application, controller 204A controls support device 206 so that source array 210's position may be changed as desired.

Turning to the seismic sensors used with the permanent source arrays, note that any type or combination of types of sensors may be used, e.g., hydrophones, geophones, accelerometers, optoacoustic, and/or electro-magnetic, and/or. In one application, sensors 240 are distributed on the ocean bottom 242. Sensors 240 may be connected to each other through corresponding cables 244 and to a central device 246. Central device 246 may collect seismic data from the sensors for storing and/or processing. Such a system is called an ocean bottom cable. Note that in one application, sensors 240 are not linked to each other, and each sensor is configured to store its seismic data. Such a system is called an ocean bottom node.

In another embodiment, sensors 250 are located on corresponding autonomous self-propelled nodes (ASN) 252. In this case, nodes 252 may be configured to move along given paths above a reservoir 260 of interest, or they may be instructed to land on the ocean bottom and record seismic data. After recording seismic data, nodes 252 may surface for transferring the data to a support vessel. The nodes may also be collected by the support vessel or by an ROV (remotely operated vehicle) for maintenance and/or battery recharging.

With this arrangement in place, a seismic wave 280 generated by a source element enters the ocean bottom 242 and is reflected at an interface 282 between the reservoir 260 and a neighboring layer. Reflected seismic wave 284 is recorded by seismic sensor 240 or other sensors.

Because each source element of a stationary source array 210 may be individually controlled, the entire source array may be controlled in a way that produces a "phased" or "beam steered" array. Ordinarily, source elements are all operated synchronously (in phase with one another), and the source array's dimension is small to avoid directivity notches in particular directions for frequencies of interest, with the objective of the source array uniformly illuminating the target area. However, in the instant situation, when trying to image weak targets 260, it is advantageous to steer source array emissions. One way to change the source array's directivity pattern is to operate multiple source elements at the same phase, but have them operate at different depths. This creates a tilted acoustic wave front; its main lobe attains a maximum at an angle away from vertical.

As an alternative, source elements operating at approximately the same depth can be phased differently. The result is that the source array's directivity pattern can be tilted to approximate the same pattern as sources operating synchronously at different depths. Phasing can be just a time delay, but because of the surface ghost contribution, in practice, the phasing scheme may be more complicated.

Another factor that can change source array directivity patterns is source element amplitude. While it is ordinarily desirable to operate all source elements at their maximum output, it is anticipated that in some situations it might be desirable to have the output of at least one source element different from the others. The difference in amplitude could be invariant with frequency or change with frequency. For example, a special case might be to use variable amplitudes to tune out the direct arrival (horizontally propagating) energy from the source array that impinges on the near offset hydrophones (see, for example, Sallas, U.S. Pat. No. 4,918, 668, the entire content of which is incorporated herein by reference). Thus, this constraint could be incorporated into a cost function as part of the target directivity pattern.

One example of how to steer a source array beam for achieving a desired directivity is now discussed. The beam-steering process can also be used to create ghost notch diversity. For example, in marine acquisition, spectral notches in down-going acoustic energy can occur in the amplitude spectrum of conventional constant depth source arrays due to the effect of destructive interference with the surface reflection. Dual-depth or variable-depth source elements provide means to counter this effect. One option is a curved source array 220. Because the source elements 222 are located at different depths, reflections will constructively and destructively interfere, causing spectral notches to be filled in when compared to constant depth arrays. Another option might be to use one or more of the source elements at different depths. In other words, for a low frequency sweep (e.g., 5-25 Hz) operate some source elements at a 25 m depth and for a high frequency sweep, lift some of the source elements to a 5 m depth and execute a high frequency sweep (e.g., 25-125 Hz).

Thus, an algorithm discussed next can be applied not only for beam-steering purposes, but also for filling spectral notches in the source array output. For simplicity, the beam-steering process discussed now is implemented using a curved source array with beam form filters. The process may be adapted to use phase steering or amplitude steering. The process also may be adapted to vertically distributed source elements 212.

Figure 3:
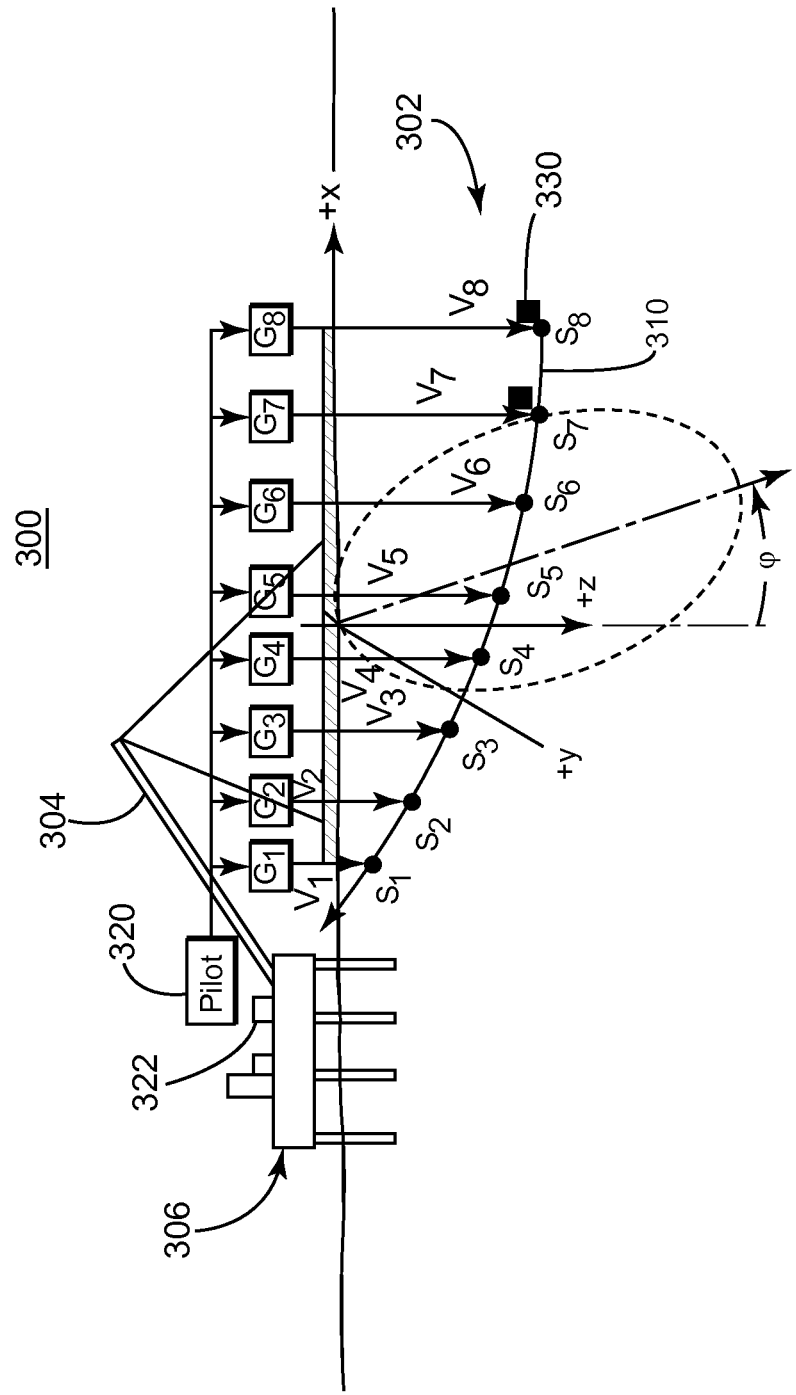
FIG. 3 is a schematic diagram of beam form filters to be applied to individual source elements to steer a beam.

With regard to FIG. 3, a source array 300 includes at least one source sub-array 302 having plural source elements S1 to S8 suspended from a support device 304 attached to a fixed structure 306. Source elements S1 to S8 are distributed along a curved line 310, which may be a parameterized curve. A pilot signal 320 that can be a conventional swept sine over a predetermined frequency range or some other excitation signal, for example, a band-limited pseudorandom signal, can be convolved with beam form filters G1 to G8 (to be calculated by a process disclosed next) to form drive signals V1 to V8. The pilot signal and the beam form filters may be processed in a controller 322 on the fixed structure 306 or a distributed controller that has some parts on the actual source elements. These signals are stored in the memory of the source controllers 330, which are located at the source elements, on controller 322, or distributed between the source elements and the fixed structure's controller. Upon receiving a command from the controller 322, sources S1 to S8 emit an acoustic signal using a feedback control system to emit acoustic energy that tracks drive signals V1 to V8. In other words, acoustic emissions of source elements S1 to S8 have the same amplitude and phase spectra as drive signals V1 to V8 that are used as reference signals by the respective source elements S1 to S8 source controllers.

Beam form filters G1 to G8 are designed to adjust the pilot signal phase and/or amplitude to ensure that acoustic energy radiated by the source array is maximized in a preferred direction over a frequency band of interest. In FIG. 3, this preferential angle is the vertical angle φ over a range of azimuths. Not shown is the azimuth angle θ, which is useful for describing the beam width. Beam form filters G1 to G8 may be designed, as a function of the source array's geometry, to direct the radiated acoustic energy with a desired vertical angle and/or azimuth angle for illuminating selected features of the subsurface 202 such as, for example, reservoir 260.

Source array performance can be optimized, subject to given constraints. In other words, an iterative search procedure can be implemented that finds filters G1 to G8 to form the beam over a range of frequencies given a certain source geometry, and calculates a performance index for that geometry. Then, the candidate source positions are changed and a new set of filters is found. The performance index for that geometry is calculated and compared to previous candidate performance. After either the desired target performance index is achieved or a best choice for a pre-determined number of loop iterations is found, the filters G1 to G8 and the corresponding source geometry are made available for download into the seismic survey system.

Figure 4:
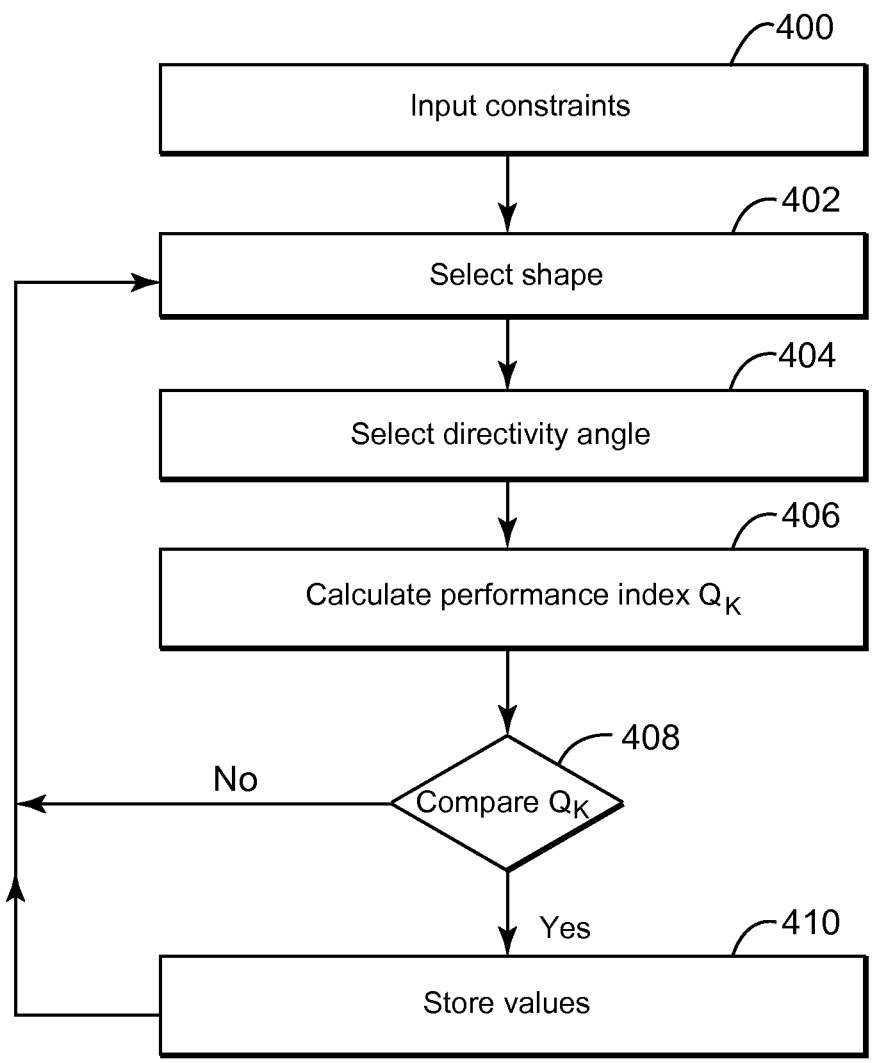
FIG. 4 is a flowchart of a method for calculating a geometry of a source array for achieving a desired beam output.

This process is now discussed in more detail with regard to FIG. 4. In step 400, various constraints related to the geometry and size of the source array are entered. For example, these constraints may include a number Ns of the real source (actual) elements, Fmin, which is a minimum frequency of interest, Fmax, which is a maximum frequency of interest, Zmin, which is a minimum source element depth, Zmax, which is a maximum source element depth, Lmin, which is a minimum source array length, Lmax, which is a maximum source array length, and $\alpha_1$ and $\alpha_2$, which define the beam azimuth angle range. Other constraints may be considered.

In step 402, a shape of line 310 may be chosen. For example, for simplicity, a sinusoid shape (a portion of a sine wave) is chosen for line 310. Other parameterized curves may be selected. Alternatively, no shape may be selected and, thus, the process itself will determine the location of the source elements based only on the constraints entered in step 400. Then, in step 404, a directivity angle φ is selected so that the algorithm maximizes the output of the source array for the selected directivity angle φ over the frequency range of interest and over a range of azimuth angles as noted in step 400.

If the source elements are spaced uniformly in the X direction, and the last element in the source array (or sub-array) is the most distant from the fixed structure and the deepest, then the X and Z positions of the nth source element, where for index n=1, 2 . . . Ns, are given by:

$$X_n = -\frac{L}{2} + \frac{(n-1)L}{N_s}, Y = 0,$$

$$\text{and } Z_n = Z_{N_s} \sin\{(\pi/2)(n+a-1)/(N_s+a-1)\},$$

where "L" is a horizontal distance between first and last source elements, "n" is the index of a source element, and "a" is a coefficient determined by the number of sources and the minimum and maximum candidate distribution source depths. The calculation of "a" is described below with reference to equation (1).

Only four parameters are necessary to determine the position of all source elements. These parameters are $N_s$, L, $Z_1$ and $Z_{Ns}$, with source element S1 at position ($-L/2, 0, Z_1$), where in this example $Z_1$ is the shallowest, and source element $S_{Ns}$ at position ($+L/2, 0, Z_{Ns}$) is the deepest at depth $Z_{Ns}$. By constraining the shape of the sub-array (which is illustrated as vertical in FIG. 2; however, the sub-array may extend along any direction), it is possible to reduce the number of parameters needed to define the positions of the source elements and this greatly reduces the size of the parameter space to be searched. If $Z_1$ is chosen to have a given value, then parameter "a" may be calculated as follows, where function a sin( ) is the arcsin function:

$$a = \frac{(N_s - 1) \cdot a\sin\left(\frac{z_1}{z_{N_s}}\right)}{\pi - 2 \cdot a\sin\left(\frac{z_1}{z_{N_s}}\right)}. \tag{1}$$

Figure 5:
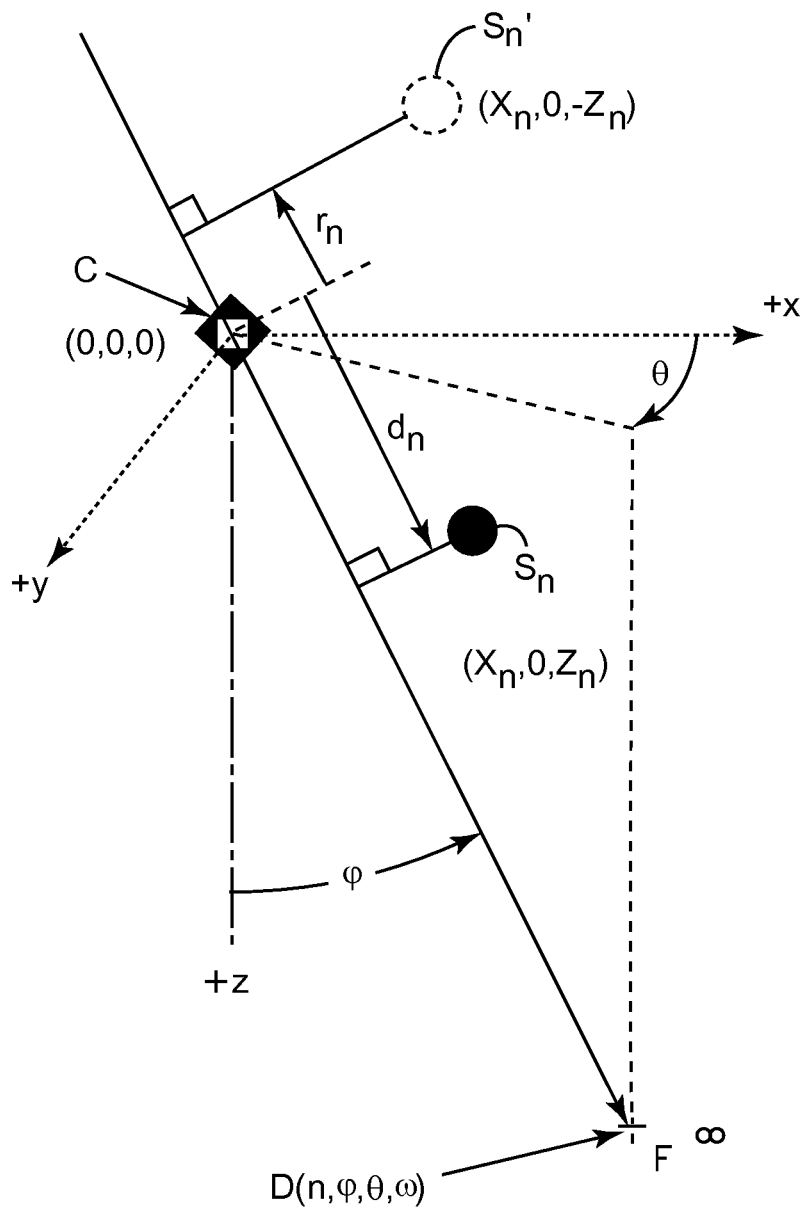
FIG. 5 is a schematic diagram of a single source element used to calculate desired beam output.

An overall performance index $Q_k$ is calculated in step 406 as follows. An effective center C of the array (or sub-array) of real and virtual sources is assumed to be at the waterline as illustrated in FIG. 5. FIG. 5 shows a single source element $S_n$ and its corresponding virtual source (or notional source) $S_n'$. A virtual source is considered to be the mirror image of the real source when the mirror surface is considered to be the water surface. The virtual source is introduced to account for the ghost introduced by the reflective property of the air-water interface, which is known to reflect seismic waves trying to escape the water. Center C of the array may be the geometrical center of the source elements if the source elements are identical. Other measures may be used for defining the array's center. In this embodiment, center C is considered to be located at the origin of the XYZ system of reference. Consider $D(n, \phi, \theta, \omega)$ to be the far-field contribution of source element $S_n$ and its ghost $S_n'$ at vertical angle $\phi$, azimuth $\theta$, for a natural frequency $\omega$. Then, in the frequency domain, the far-field contribution can be expressed as:

$$D(n,\phi,\theta,\omega)=G(n,\omega)\cdot\{e^{j\omega d_n/c}-e^{-j\omega r_n/c}\}, \quad (2)$$

where G is the beam form filter, $d_n$ is the orthogonal projected distance of $S_n$ along the ray path from C to an imaginary point F at infinity where the far-field signature is calculated, and $r_n$ is the orthogonal projected distance of the notional source $S_n'$ along the ray path from C to the imaginary point F. Thus, $d_n$ is given by:

$$d_n=X_n\sin(\phi)\cos(\theta)+Z_n\cos(\phi) \quad (3)$$

and $r_n$ is given by:

$$r_n=X_n\sin(\phi)\cos(\theta)-Z_n\cos(\phi). \quad (4)$$

If $A(\phi, \theta, \omega)$ is the total far-field combined output of the source array at vertical angle $\phi$, azimuth angle $\theta$ and natural frequency $\omega$, i.e., the sum of the contributions from $S_1$ to $S_{Ns}$ and their surface reflections, then is $$A(\phi,\theta,\omega)=\Sigma_{n=1}^{Ns}D(n,\phi,\theta,\omega). \quad (5)$$

Next, the values for the filters $G_1$ to $G_{Ns}$ are computed based on equation (5) for each frequency. In practice, a set of discrete frequencies are selected and the filters for this frequency set are calculated, and then the values for the filters for other frequencies are interpolated from the calculated filter values. In other words, suppose that the frequency band of interest is 10 to 30 Hz and the frequency subset includes discrete frequencies 10, 16, 20, 25 and 30 Hz. Then, the performance index is calculated only for these discrete frequencies to provide a solution for filters $G_1$ to $G_{Ns}$. For all other frequencies emitted by the source array in the band of 10 to 30 Hz, the values for filters $G_1$ to $G_{Ns}$ are calculated by interpolation or other equivalent mathematical process. The frequency band and discrete frequencies noted above are only exemplary and are not intended to limit the invention. The interpolation operation assumes that the G functions have smooth transitions. Thus, the G function for a given frequency $\omega$ and a given source element n is given by:

$$G(n,\omega)=B(\omega)e^{+j[\omega(\tau_n)+\theta(n,\omega)]} \quad (6)$$

where $B(\omega)$ is an amplitude level which is non-zero and real, $\tau_n$ is a time advance, and $\theta(n, \omega)$ is an added phase perturbation function. $\theta(n, \omega)$ is assumed to smoothly vary with frequency, so it could take the form of a polynomial like a quadratic whose coefficients $k_2$, $k_1$ and $k_0$ are to be solved such that $\theta(n, \omega)<\pi$. If a mixture of source models were to be deployed with different output levels and/or were to be operated over different frequency bands that were a subset of Fmin to Fmax band, that information may be included in the amplitude level term $B(\omega)$.

The overall performance index $Q_k$ for the kth source geometry candidate may take the following form:

$$Q_k=\Sigma_{m=1}^{Nf}|\hat{A}(\phi,\omega_m)|^2/[1+\lambda P(\phi,\omega_m)] \quad (7)$$

where $|\hat{A}(\phi, \omega_m)|$ is the mean magnitude of the far-field output in the $\phi$ direction averaged over the azimuth angle range $\alpha_1<\theta<\alpha_2$ using the beam form filters G that maximize the average output over the azimuth angle range in the $\phi$ direction at discrete frequency $\omega_m$, and $P(\phi, \omega_m)$ is a penalty function that is discussed next. Note that the performance index $Q_k$ is summed over a given number of frequencies $N_f$. This number may vary from survey to survey, depending on the survey's needs. Note that the performance index may be defined to take another form.

In one application, the penalty function $P(\phi, \omega_m)$ may be used, with $0<P(\phi, \omega_m)$, to introduce other problem constraints. For example, the penalty function can be used to ensure there are no spectral notches in the output at particular frequencies, and/or that the source elements are not over- or under-driven, and/or the array length is not too large, and/or the array depth is not too deep. Parameter $\lambda$ is a weighting parameter having a value equal to or larger than zero. Thus, when the value is zero, the penalty function has no effect. As parameter $\lambda$ is increased, the penalty function has a greater impact on the final outcome of the candidate source elements distribution.

Then, in step 408 a decision is made whether the found candidate source elements distribution is appropriate. If the answer is yes, the values of the performance index, the candidate source elements distribution and the beam form filters are stored in step 410 in a memory device. Optionally, the process may return to step 402 for finding an even better distribution. If the answer is no, the process automatically returns to step 402 for finding another distribution.

To facilitate the acquisition process, if the source array's geometry is known beforehand, tables of beam form filters for various beam shapes could be computed prior to the seismic survey and their values stored and catalogued in a filter library on the fixed structure's controller. The filters could be catalogued/indexed by the preferred vertical and azimuth angles or other descriptor that informs the user as to the shape and/or direction of the radiated energy. While conducting a seismic survey, seismic data may be collected utilizing one set of beam form filters. Then, the process may be repeated using a different choice of beam form filters to change the area of the target to be illuminated.

Figure 6:
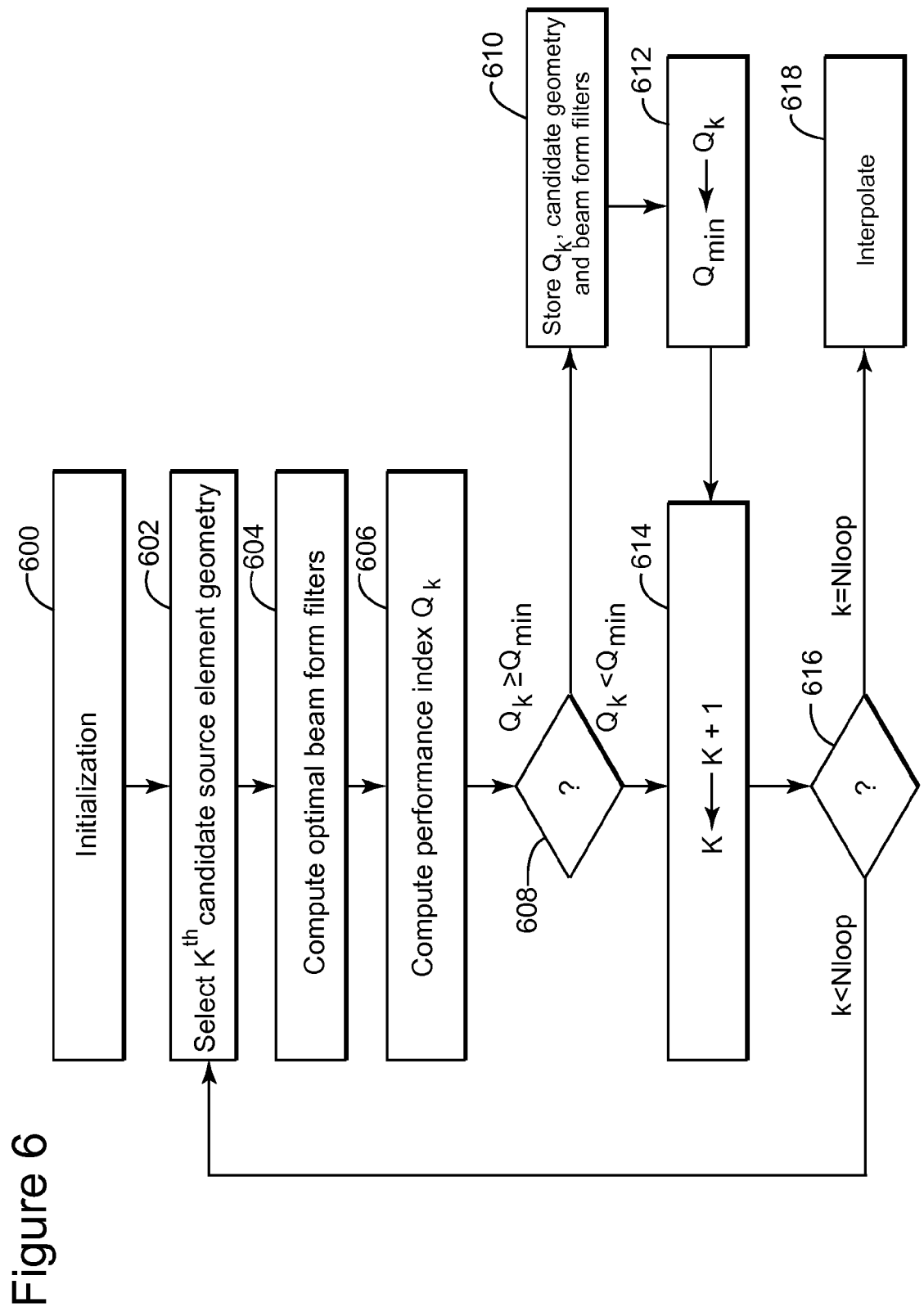
FIG. 6 is a flowchart of a method for calculating beam form filters of a source array having plural source elements.

The above-discussed method may be implemented in a controller, as discussed next, located on the fixed structure, for forming a beam that achieves a desired target illumination. With regard to FIG. 6, implementation includes a step 600 in which the controller is initialized. This step may include, for example, setting a number of loops to run for the best source elements distribution, setting an index k, initializing a minimum acceptable performance index Qmin, etc. Then, in step 602, a source elements distribution (geometry) is selected and optimal beam form filters are computed in step 604, for example, based on equations (5) and (6). Note that source elements distribution may be fixed, for example for source array 230, or it may be adjusted as for source array 220. In step 606, the performance index $Q_k$ is calculated, for example, based on equation (7). The result of this step is compared in step 608 with a given value $Q_{min}$. If the computed value $Q_k$ is greater than $Q_{min}$, then $Q_k$, the considered geometry of the source elements and the calculated beam form filters G, is stored in a memory in step 610. The process may then be repeated for a new geometry (source elements distribution) after $Q_{min}$ is updated in step 612 and index k is increased in step 614. In step 616, it is verified that the loop number is still smaller than a given loop number Nloop. If the result is yes, the process returns to step 602 for selecting another candidate and repeating the above-noted steps. If the result is no, the process is terminated, but not before calculating in step 618 the value of $Q_k$ for other frequencies than those noted in equation (7). This step may include an interpolation procedure for calculating the performance index for a frequency $f_a$, which lies between frequencies $f_i$ and $f_{i+1}$ used in equation (7). These results are also stored in the memory.

Figure 7:
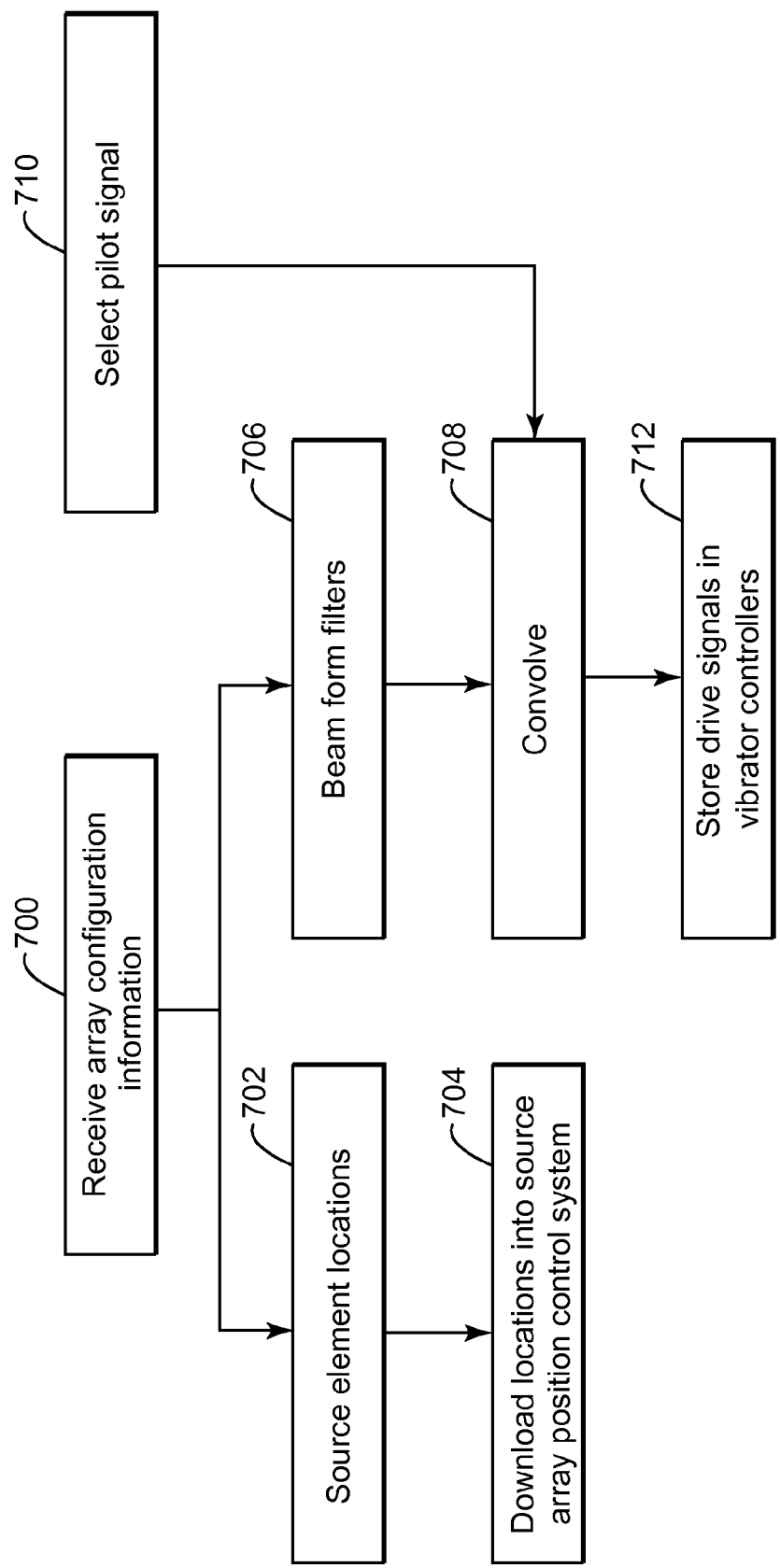
FIG. 7 is a flowchart of a method for calculating drive signals for a source array with a steerable beam.

Having determined the source elements distribution that best achieves the desired far-field output, the controller may implement the following process illustrated in FIG. 7. Note that the process described in FIG. 6 may be omitted if the source array's geometry is fixed. In step 700, the controller noted above or another controller receives the source array configuration information, i.e., the source elements distribution. This may include the X, Y and Z position for each source element of the source array as noted in step 702. This information is sent in step 704 to a source array position control system, which may be controller 322 or any other controller. Then, the controller implements these positions by adjusting the available support device 206. This step is skipped if the source array's geometry is fixed.

The controller may also receive in step 700 the beam form filters 706 (calculated as illustrated in FIGS. 4 and/or 6), which are convolved in step 708 with a pilot signal 710 to form in step 712 the drive signals, which are stored in the vibrator controllers. Then, when the newly calculated drive signals of the source elements are ready in the source elements local controllers, controller 322 instructs the local controllers to drive the source elements to obtain the desired beam shape.

Figure 8:
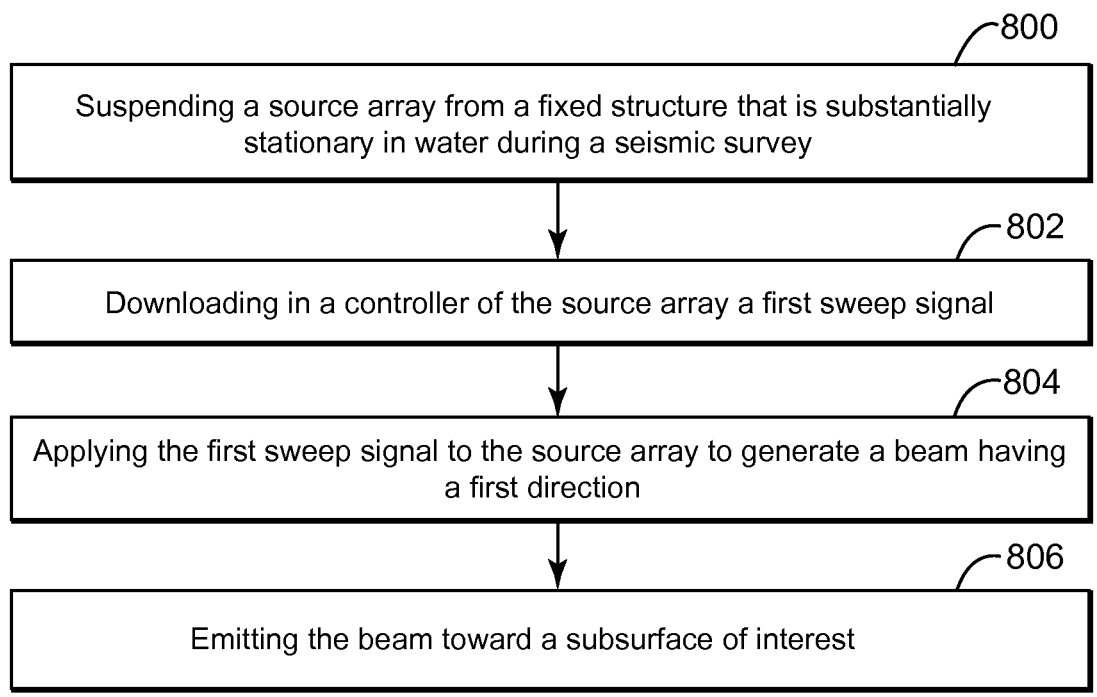
FIG. 8 is a flowchart of a method for steering a beam of a substantially permanent source array.

According to an embodiment illustrated in FIG. 8, there is a method for illuminating a weak underwater target. The method includes a step 800 of suspending a source array from a fixed structure that is substantially stationary in water during a seismic survey, a step 802 of downloading in a controller of the source array a first sweep signal, a step 804 of applying the first sweep signal to the source array to generate a beam having a first direction, and a step 806 of emitting the beam toward a subsurface of interest.

The previous embodiments have been discussed, for simplicity, for source elements emitting the same frequencies, i.e., having the same size. However, it is possible to apply the methods discussed above to source elements not emitting the same frequencies at the same time. This case may be treated as having two independent arrays. Thus, mutual impedance is not a real issue, since frequencies from one source array should be orthogonal with frequencies from the other source array at the same point in time, although some nonlinear effects may be present. For example, the small source elements, while trying to generate frequency F2, might see the pressure field created by the large source elements operating at frequency F1. Thus, if small and large source elements are too close to one another, there might be some intermodulation distortion produced in the smaller vibrators, i.e., some F2−F1 and some F2+F1 energy.

It is believed that this effect will be mitigated if the small source elements are at much shallower depth than the large source elements, because the large source surface ghost tends to cancel the contribution of the large source element as seen by the shallow small source element. This is so because the large source element ghost and the large source element will be nearly the same distance from the small source element, but opposite in polarity. Thus, if there are large and small source elements in the same source array, it is possible to optimize these separately and to use one solution to limit the positions of the source elements allowed for the second solution.

Another situation is possible when small and large source elements work at the same frequency at the same time. The problem becomes that the mutual loading effect the large source element exerts on the small source element may actually exceed the self-radiation impedance of the small source. For example, if a small source element with a radiation mass of 30 kg (self-impedance) is near a large source element trying to deliver the same frequency at the same time, the mutual impedance effect from the large source element might create an added load on the small vibrator of 50 kg, which will overwhelm the small source element. Thus, one solution is to first ensure that the large and small source elements are not too close to one another, i.e., separate geometry constraints for the large source array and the small source array. For example, it is possible to define the range for each source array so the maximum depth allowed for the small source array is more than "B" meters away from the shallowest large source array, which essentially means that the small source elements are confined to 2-5 m depth and the larger source arrays are confined to 19-25 m, so "B," the minimum separation distance, would be B=14 m. Then, for the cost function, the process computes the maximum radiation mass seen by any element in the large source array, and the process also computes the maximum radiation mass seen by any element in the small piston array. The solution for the placement of large and small source elements is chosen to minimize the maximum radiation impedance of the large sources elements, provided that the maximum radiation impedance seen by any small source element does not exceed some amount which might require that the small source element be operated at reduced output (say 50%) to avoid overheating or overcurrent.

Another improvement of the above-described embodiments is now discussed. This improvement deals with the concept of optimizing the geometry and/or drive signal(s) for a plurality of source arrays in which each source array generates a particular range of frequencies such that their combined effect meets/maintains an illumination objective over a wider range of frequencies. For example, a first source array might cover the range of 5-25 Hz and a second source array might cover the same 5:1 frequency range, i.e., 25-125 Hz. The second source array has the same overall shape as the first source array, but is scaled dimensionally in proportion to the frequencies of interest, as discussed above. Each source array may or may not comprise an identical number of source elements.

An illustrative example includes a first source array covering the band of 5-25 Hz operating at a depth of 25 m with a rectangular shape of about 30 by 25 m. If the second source array covers the band ranging from 25-125 Hz, then it operates at five times the frequency of the first source array so the dimensional scaling factor would be five. The second source array would operate at a depth of 5 m with a rectangular shape of about 6 by 5 m. The resultant spectral notches due to the surface reflection for each source array will be frequency scaled by a factor of five. For example, there would be a ghost notch in the down-going energy for the first source array that falls at about 30.4 Hz if the speed of sound in water is 1520 m, and peak in output at 15.2 Hz due to constructive interference from the free surface. These same effects would occur in the second source array with the notch falling at about 152 Hz and the peak at about 76 Hz, scaled in frequency by a factor of five. Likewise the directivity pattern vs. frequency for the second source array would match the directivity pattern vs. frequency for the first array with the same frequency scaling; for example, the directivity pattern of the second array when operating at 50 Hz would produce the same pattern as the first array operating at 10 Hz. Note the frequency bands for each source array could also have some overlap, like the first source array 5-28 Hz and the second source array 25-140 Hz. Also, the source arrays may be offset from one another and not necessarily stacked with one above the other.

The same methodology may be applied to variable depth arrays like curved source arrays. If the curvature of the second source array was a frequency-scaled version of the first source array, then the same directivity relationship should apply as for the case of two single-depth arrays.

For one embodiment, the source elements in the first source array can be identical in make/model and be operated using the same drive signal. The source elements comprising the second source array can be identical in make/model and be operated using the same drive signal. However, the source elements from the first source array may be different from the source elements in the second source array.

In another embodiment, the source elements within each source array may not have the same drive signals applied to each source element within that source array. For example, a frequency variant phase-shifted version of the drive signal might be applied to different source elements within a given source array to alter or maintain a desired beam direction or beam shape as frequency changes. For example, the first source array covers the range of 5-25 Hz, and phase shifts are applied to the drive signals going to the source elements that comprise the first source array such that the beam intensity is maximized at an angle of 10 degrees from vertical so that more energy could be directed in a preferred direction over the range of 5-25 Hz. The phase shifts applied to the second source array elements would be designed to direct the maximum radiated energy in the same preferred direction of 10 degrees for this simple example.

In still another embodiment, the location, phasing and amplitude of each source element in a first low-frequency source array might be selected to minimize the formation of side-lobes in the directivity pattern. For a second source array, i.e., the high-frequency source array, the source element positions, phasing and amplitude could be designed to observe the same objective of side-lobe minimization. Dividing the spectrum between the two source arrays, with the low-frequency source array being of larger dimension than the second source array, facilitates the ability to find phase and amplitude settings that will maintain good signal strength over the full bandwidth of interest without the creation of unwanted side-lobes.

In still another embodiment, the source array dimension could be selected and drive signals designed so that the beam shape can be made variable to correspond to the frequencies expected to be received from different target depths. Low frequencies for example, may be more important for imaging subsalt, while higher frequencies are useful for pre-salt subterranean features. Thus, energy returning from subsalt images can have ray paths that deviate from vertical, more so than arrivals from shallow pre-salt events. For example, for the low frequencies, the beam shape could be adjusted to provide wide beam illumination, and then for high frequencies, the beam shape can be focused to better image shallow reflections. If desired, and the low frequency array is large enough in dimension, the opposite could also be possible so the low frequency energy is concentrated in a preferred direction while the high frequency emissions might have a wider beam illumination.

According to another embodiment, a 3D image of the reservoir is achieved by using source arrays 210 and 220 located on different fixed structures 204 and 208 in the area of interest. This arrangement, also illustrated in FIG. 2, provides greater flexibility in illuminating the target area. For example, in conducting a survey, source arrays 210 and 220 may be individually utilized, with only one source array active at any given point in time or simultaneously. For simultaneous operation, each source array can use a unique pilot signal designed to be uncorrelated or weakly correlated with the pilot signals for the other source arrays. The pilots can be swept-frequency type or employ pseudorandom sequences. Another possibility is for the various source arrays to be time scheduled, or programmed to emit unique single frequencies for a prescribed time duration and then switch to a different frequency, with all frequencies of interest eventually emitted by each source array.

According to another embodiment, the above-discussed systems may be configured, because of their permanent status, to be accessible to various operators. Traditionally, each seismic operator owns a flotilla of vessels that tow various seismic source arrays and streamers. An oil and gas company that explores the reservoir or intends to survey a given area hires the seismic operator to perform the seismic survey. Then, the seismic operator moves its equipment from wherever it is stored, sometimes from hundreds, if not thousands, of miles away, to the given area and performs the survey. Moving all this equipment (i.e., vessels, sources, streamer and support equipment) is expensive and time-consuming.

Thus, according to an embodiment, one or more source arrays and/or associated sensors may be configured to be permanently installed around areas of interest (e.g., around a known marine reservoir) and to be offered to any interested party for rent. If the seismic acquisition system is already in place, the renting party essentially needs to power up the system, download the desired sweeps or shooting times to the source array, wake up the sensors, and simply start the seismic survey. Note that the renting party does not have to bring any piece of equipment for generating or recording seismic data. To be able to power up the system, the renting party may be provided with access to an interface unit, to be discussed later, for allowing only authorized parties to start the seismic system.

In another embodiment, the renting party may want to rent sources to augment moving sources towed behind a vessel to get more different shot offsets on a survey. Also, it might be possible that the seismic contractor wants to use the stationary sources and tow a short streamer containing just receivers to acquire some infill data for areas not covered by OBC or ASN's or to increase receiver density.

Figure 9:
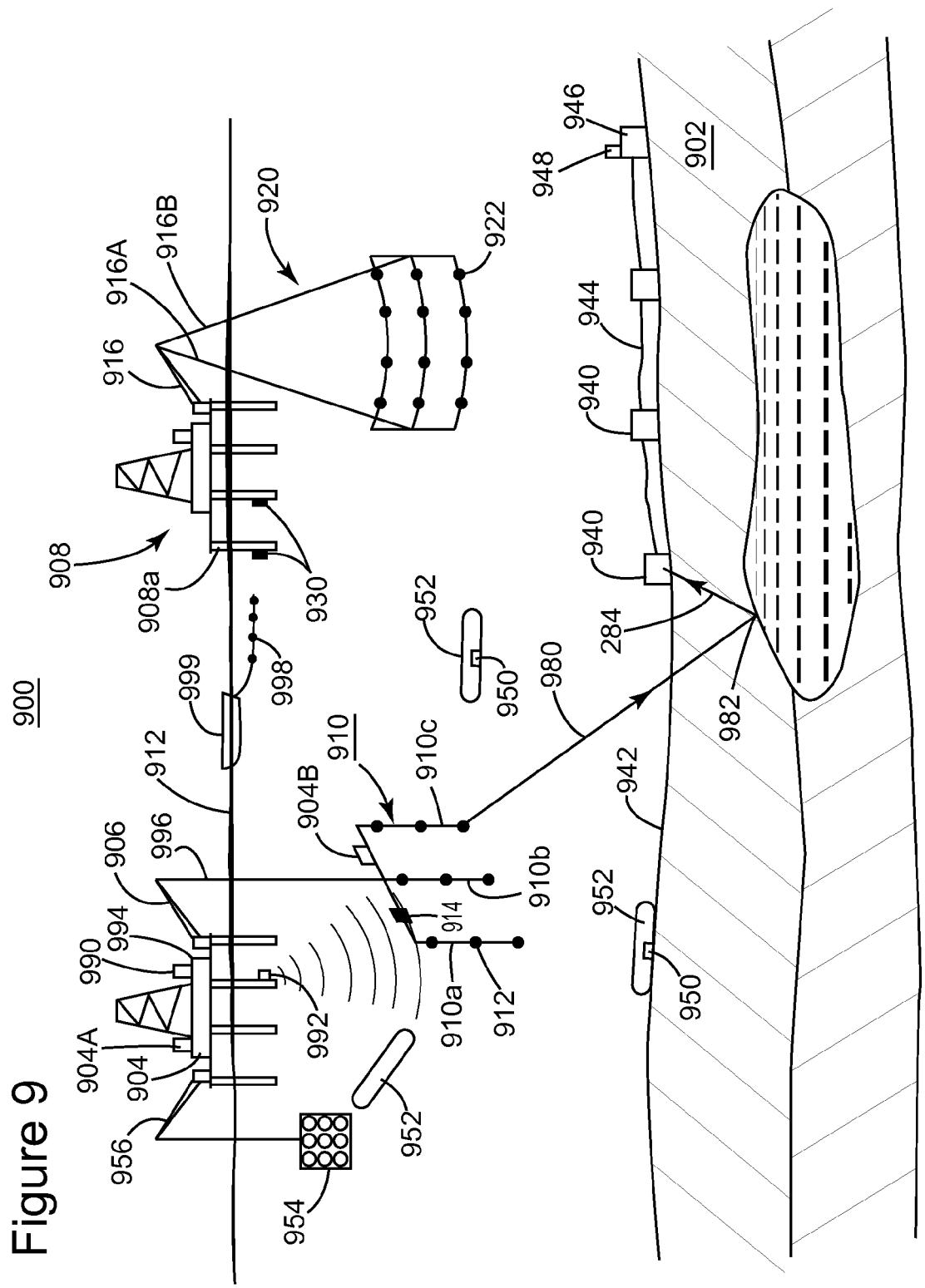
FIG. 9 is a schematic diagram of a marine seismic survey system for rent that uses a permanent source array having a steerable beam.

More specifically, as illustrated in FIG. 9, a ready-to-use system 900 is already deployed. System 900 is substantially identical to that illustrated in FIG. 2, and for that reason, the already-discussed elements are not discussed again. Those elements of FIG. 9 similar to elements of FIG. 2 have reference numbers with the same two last digits.

What is different is an interface unit 990 located, for example, on the fixed structure 904 and connected by wired or wireless means to at least one of source array 910 and sensors 940 or to a central device 946. Interface unit 990, when activated, offers an operator the opportunity to communicate with the source array and/or central device. For example, source array 910 is by default in a locked mode, i.e., it is not operational because there is no power, no compressed air (if including air guns), no data communication. If an operator enters a correct passcode 994 (e.g., a password, a dongle, etc.) access is gained to interface unit 990. Once access is obtained, the operator may enter commands through the interface unit to instruct the source array 910 to change from locked mode to operation mode, i.e., to wake up, change its overall position (e.g., lower into the water if the source array is stored on the fixed structure, etc.) or change its geometry as discussed with regard to source array 920. Also, it is possible for the operator to position the source array at a first depth for a low frequency sweep and then at a second depth for a high frequency sweep. Other combinations of depths and frequency sweeps are possible. If the source array includes vibratory source elements 912, the operator may download a driving signal for each or all of the source elements. Access to the interface unit also provides power to the source array. If the source array includes impulsive source elements, e.g., air guns, a compressor (not shown) on the fixed structure is started, electric power is turned on, and a sequence of shooting times may be downloaded to controller 904A and/or the source array.

One way for establishing communication between the interface unit and the source array is a wired connection 996. Alternatively, interface unit 990 may be connected to an acoustic transceiver 992, located for example, underwater on fixed structure 904. Interface unit 990 transmits commands to acoustic transceiver 992, which in turn communicates with a source transceiver 914 and/or a receiver transceiver 948. Source transceiver 914 may be located anywhere on source array 910, and receiver transceiver 948 may be located on central unit 946 or directly on the sensor 940.

In one embodiment, seismic sensors 940 are located on fixed nodes distributed on the ocean bottom. However, in another embodiment, the seismic sensors may be located on ASN 952. For this case, a base 954 may be suspended from support device 956, and base 954 is configured to store plural ASN 952. Base 954 may be equipped with appropriate technology for guiding the ASNs 952 at desired positions, either on or above the ocean bottom for recording seismic signals. Once the survey is finalized, the base controls the ASNs back to the base, where their batteries are recharged and their payload (i.e., seismic data) is transferred to the fixed structure, on a suitable portable media for transport to the operator's processing center. In still another embodiment, seismic sensors 998 are towed by a vessel 999 in a traditional way. In one application, any combination of sensors may be used, i.e., ocean bottom nodes, ASNs and streamers.

Figure 10:
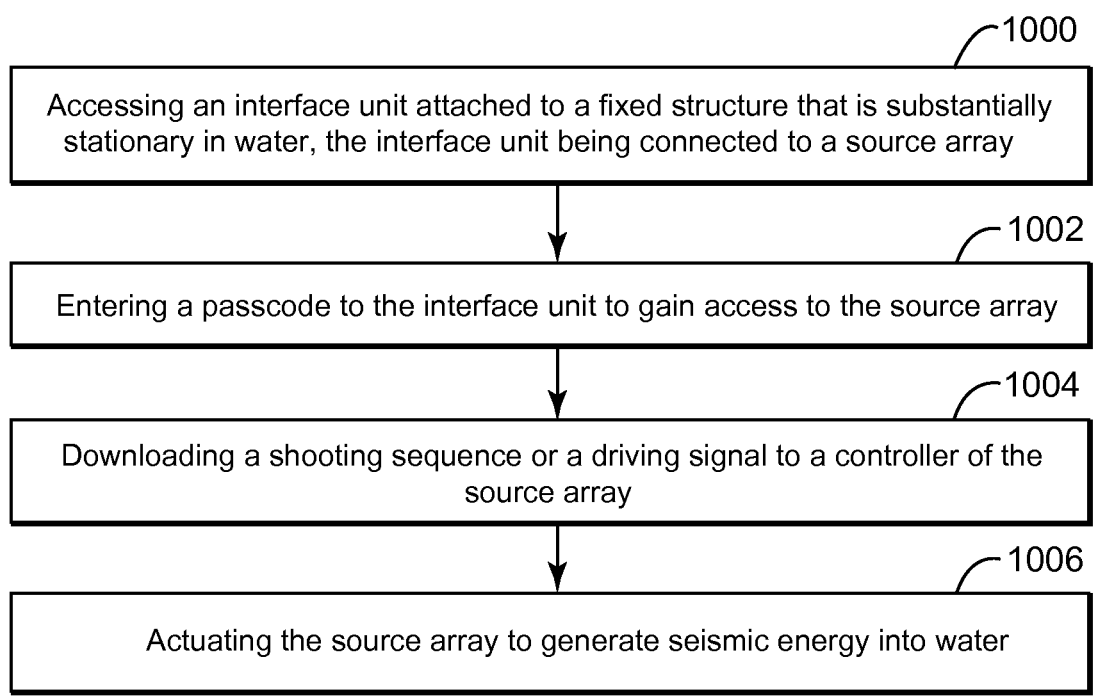
FIG. 10 is a flowchart of a method for renting a stationary marine seismic survey system.

According to an embodiment illustrated in FIG. 10, there is a method for obtaining control of a source array configured to generate seismic waves. The method includes a step 1000 of accessing an interface unit attached to a fixed structure that is substantially stationary in water, the interface unit being connected to a source array, a step 1002 of entering a passcode to the interface unit to gain access to the source array, a step 1004 of downloading a shooting sequence or a driving signal to a controller of the source array, and a step 1006 of actuating the source array to generate seismic energy into water.

Figure 11:
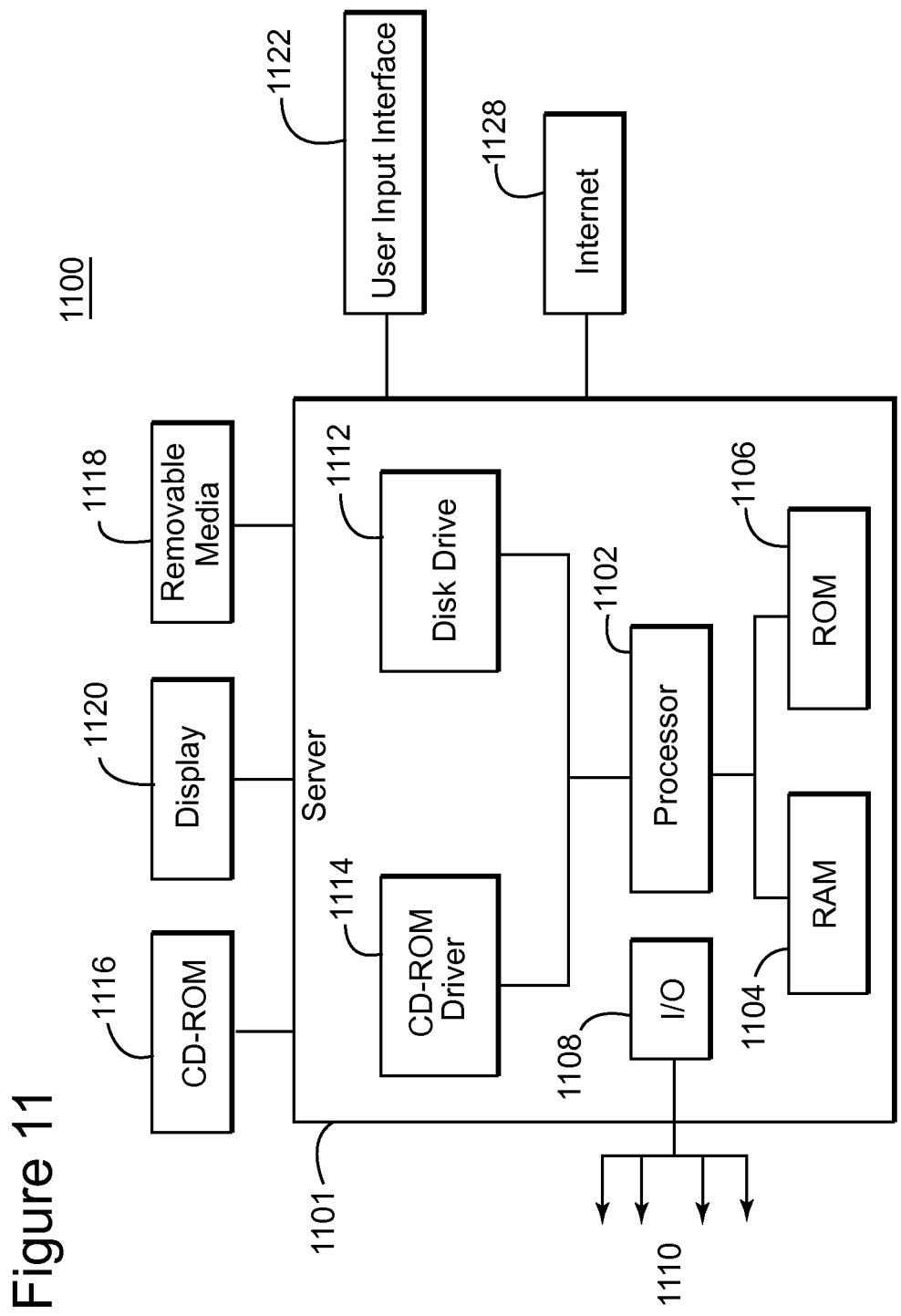
FIG. 11 is a schematic diagram of a control system.

An example of a representative control system capable of carrying out operations in accordance with the exemplary embodiments discussed above is illustrated in FIG. 11. Hardware, firmware, software or a combination thereof may be used to perform the various steps and operations described herein.

The exemplary control system 1100 suitable for performing the activities described in the above-noted embodiments may include server 1101. Such a server 1101 may include a central processor unit (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110, to provide control signals and the like. For example, processor 1102 may communicate with the sensors, electromagnetic actuator system and/or the pressure mechanism. Processor 1102 carries out a variety of functions as are known in the art, as dictated by software and/or firmware instructions.

Server 1101 may also include one or more data storage devices, including hard and disk drives 1112, CD-ROM drives 1114, and other hardware capable of reading and/or storing information, such as a DVD, etc. In one embodiment, software for carrying out the above-discussed steps may be stored and distributed on a CD-ROM 1116, removable media 1118 or other form of media capable of portably storing information. These storage media may be inserted into, and read by, devices such as the CD-ROM drive 1114, the disk drive 1112, etc. Server 1101 may be coupled to a display 1120, which may be any type of known display or presentation screen, such as LCD, plasma displays, cathode ray tubes (CRT), etc. A user input interface 1122 is provided, including one or more user interface mechanisms such as a mouse, keyboard, microphone, touch pad, touch screen, voice-recognition system, etc.

Server 1101 may be coupled to other computing devices, such as the equipment of a vessel, via a network. The server may be part of a larger network configuration as in a global area network (GAN) such as the Internet 1128, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

Some of the disclosed embodiments provide a source array, source element and a method for using, in a marine environment, substantially permanent source arrays having the capability to steer their beams. Other disclosed embodiments provide a substantially permanent source array for hire. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic data acquisition system for collecting seismic data, the system comprising:
   a fixed structure floating at the water surface;
   a support device directly connected to the fixed structure;
   a marine source array suspended in water from the support device, the marine source array including vibratory source elements; and
   a controller configured to control the vibratory source elements so that a beam formed by the source array is steerable,
   wherein the controller is configured to change a geometry of the source array.

2. The system of claim 1, wherein the support device supports the source array so that the source array is substantially stationary and the support device is a crane.

3. The system of claim 1, wherein the controller is configured to change a position of the source array relative to the fixed structure.

4. The system of claim 1, wherein the controller is configured to steer the beam to a desired region of a subsurface to be surveyed.

5. The system of claim 1, wherein the controller is located on the source array.

6. The system of claim 1, wherein the controller is located on the fixed structure.

7. The system of claim 1, wherein the fixed structure is an oil platform.

8. The system of claim 1, further comprising:
   seismic sensors attached to the ocean bottom.

9. The system of claim 1, further comprising:
   seismic sensors attached to autonomous self-propelled nodes.

10. The system of claim 1, wherein the controller stores a library of drive signals, each drive signal, when applied to the source array, driving the source elements so that the beam has a given vertical angle with gravity and a given azimuth.

11. A marine source array for generating seismic energy, the source array comprising:
    plural vibratory source elements attached directly to a fixed structure substantially stationary in water; and
    a controller configured to control the vibratory source elements so that a beam formed by the source array is steerable,
    wherein the fixed structure floats at the water surface, and
    wherein the controller is configured to change a geometry of the source array.

12. The source array of claim 11, wherein the source elements are distributed along vertical lines.

13. The source array of claim 11, wherein a geometry of the source array is adjustable.

14. The source array of claim 11, wherein the controller is configured to steer the beam to a desired region of a subsurface to be surveyed.

15. The source array of claim 11, wherein the controller communicates with a global controller located on the fixed structure.

16. The source array of claim 11, wherein the controller stores a library of drive signals, each drive signal, when applied to the source array, driving the source elements so that the beam has a given vertical angle with gravity and a given azimuth.

17. A method for illuminating a weak underwater target, the method comprising:
    suspending a source array from a support device, which is directly connected to a fixed structure that is substantially stationary in water during a seismic survey;
    downloading in a controller of the source array a first sweep signal;
    applying the first sweep signal to the source array to generate a beam having a first direction while the source array is suspended from the fixed structure; and
    emitting the beam toward a subsurface of interest,
    wherein the controller is configured to change a geometry of the source array.

18. The method of claim 17, further comprising:
    downloading in the controller of the source array a second sweep signal; and
    applying the second sweep signal to the source array to generate a beam having a second direction.

19. The method of claim 17, further comprising:
    calculating a library of frequency sweeps for various directions corresponding to weak illumination targets of the subsurface of interest.

* * * * *